United States Patent
Gu

(10) Patent No.: US 11,634,086 B2
(45) Date of Patent: Apr. 25, 2023

(54) VEHICLE-TAIL-MOUNTED BICYCLE PAD

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 157 days.

(21) Appl. No.: 17/335,087

(22) Filed: Jun. 1, 2021

(65) Prior Publication Data

US 2022/0379817 A1 Dec. 1, 2022

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ................................. B60R 9/06; B60R 9/10
USPC ........................................................ 224/403
See application file for complete search history.

(56) References Cited

U.S. PATENT DOCUMENTS

| | | | | |
|---|---|---|---|---|
| D323,639 S | * | 2/1992 | Creamer | D12/401 |
| 5,104,171 A | * | 4/1992 | Johnsen | B62D 33/0273 296/57.1 |
| 5,255,464 A | * | 10/1993 | Marecek | G09F 21/048 40/591 |
| 6,286,885 B1 | * | 9/2001 | Ramos | B60R 13/01 296/64 |
| 6,695,556 B2 | * | 2/2004 | Addy | B60R 9/00 410/97 |
| 8,061,761 B1 | * | 11/2011 | Sierra | G09F 21/048 296/136.01 |
| 9,522,767 B1 | * | 12/2016 | Pass | G09F 21/04 |
| 9,701,225 B1 | * | 7/2017 | Hogan | A47C 4/52 |
| 10,300,861 B1 | * | 5/2019 | Green | B60R 7/02 |
| 10,343,617 B2 | * | 7/2019 | Cox | B60R 9/10 |
| 10,696,236 B1 | * | 6/2020 | Starkey | B60P 1/283 |
| 11,491,856 B2 | * | 11/2022 | Low | B60R 9/10 |
| 2002/0135202 A1 | * | 9/2002 | Rokahr | B62D 33/0273 296/57.1 |
| 2003/0038497 A1 | * | 2/2003 | Fitzgerald | B60R 5/04 296/39.1 |
| 2008/0203752 A1 | * | 8/2008 | Warkentin | B62D 33/0273 296/57.1 |
| 2017/0144614 A1 | * | 5/2017 | DePalma | B60R 13/013 |
| 2019/0337464 A1 | * | 11/2019 | Cox | B60R 9/06 |
| 2020/0331332 A1 | * | 10/2020 | Low | B60J 11/06 |
| 2022/0001808 A1 | * | 1/2022 | Low | B60R 13/01 |

* cited by examiner

*Primary Examiner* — Peter N Helvey

(57) ABSTRACT

A vehicle-tail-mounted bicycle pad includes a main pad body, a blocking plate, a bicycle frame securing set and a securing band set. The main pad body includes an in-vehicle part and an out-vehicle part connected to each other, and the out-vehicle part includes an opening. The blocking plate has a side connected to the main pad body, and another side movably connected to the main pad body through a zipper set. The blocking plate can movably block the opening and includes a first Velcro, the in-vehicle part includes a second Velcro, and the first Velcro and the second Velcro are movably attached with each other. The bicycle frame securing set is disposed on a top surface of the in-vehicle part. The securing band set includes a band body and a buckle ring disposed on sides of the out-vehicle part and the in-vehicle part.

8 Claims, 9 Drawing Sheets

VEHICLE-TAIL-MOUNTED BICYCLE PAD

BACKGROUND OF THE INVENTION

1. Field of the Invention

The present invention is related to a vehicle-tail-mounted bicycle pad which is generally disposed on a tail of a pickup truck and configured to secure the bicycle to prevent the bicycle and the pickup truck from being scratched mutually.

2. Description of the Related Art

Since the four-wheeled vehicle was invented by humans, it has become an indispensable transportation tool in human life, and currently the four-wheeled vehicles can be divided into many models according to the purpose of the user. For example, a pickup truck being a model with high visibility has advantages of excellent four-wheel driving capability, excellent off-road capability, and large cargo space.

Generally, it's quite common to use the pickup truck to carry a bicycle, and the bicycle is usually straddled and secured on the vehicle-tail baffle plate. However, each of the bicycle and the pickup truck has a lot of metal parts, and it is inevitable to occur bump when the vehicle is traveling, so the conventional securing method easily causes the bicycle and the pickup truck to be scraped mutually, and it results in abraded appearances of the bicycle and the pickup truck. Therefore, in order to solve this problem, a conventional vehicle-tail-mounted bicycle pad was proposed to straddle and mount on the vehicle tail to effectively prevent the bicycle and the pickup truck from being scraped mutually.

The current commercially available vehicle is usually equipped a camera lens (such as reversing camera lens or a driving recorder) in a vehicle tail thereof, so the conventional vehicle-tail-mounted bicycle pad usually has an opening and a blocking plate for covering the opening, but this configuration may have different problems according to whether the vehicle tail is set with the camera lens. For example, in a condition that the vehicle tail is set with the camera lens, when the vehicle-tail-mounted bicycle pad is used in this condition, the blocking plate must be lifted up to expose the camera lens, but the lifted blocking plate may easily drop to cover the opening to impact function of the camera lens because bump is inevitably occurred when the vehicle is traveling. In a condition the vehicle tail is not set with the camera lens, when the vehicle-tail-mounted bicycle pad is used in this condition, it is necessary to maintain the blocking plate to block the opening, but a gap may be formed between the blocking plate and the opening because bump inevitably occurs when the vehicle is traveling, and a part of the bicycle may be directly passed through the aforementioned gap to contact and scratch the vehicle body mutually.

SUMMARY OF THE INVENTION

An objective of the present invention is to provide a vehicle-tail-mounted bicycle pad including a blocking plate movably connected to a main pad body through a zipper set. Therefore, in a condition that the vehicle tail is not set with the camera lens, the blocking plate can be well connected to main pad body, so as to prevent from forming a gap between the main pad body and an opening because of bump during the vehicle traveling. Furthermore, the blocking plate of the present invention also include a first Velcro disposed thereon, and in the condition that vehicle tail is set with camera lens, when the blocking plate is lifted up, the lifted blocking plate can be attached with a second Velcro of the main pad body by the first Velcro, so as to prevent the lifted blocking plate from dropping during vehicle traveling.

In order to achieve aforementioned objective and effect, the present invention provides a vehicle-tail-mounted bicycle pad including a main pad body, a blocking plate, a bicycle frame securing set and a securing band set. The main pad body includes an in-vehicle part and an out-vehicle part connected to each other, and the out-vehicle part includes an opening formed thereon. The blocking plate has a side connected to the main pad body, and another side, which is not directly connected to the main pad body, movably connected to the main pad body through a zipper set. The blocking plate is configured to movably block the opening, the blocking plate includes a first Velcro disposed on a surface thereof away from the main pad body, the in-vehicle part includes a second Velcro disposed on a top surface thereof, and the first Velcro and the second Velcro are movably attached with each other. The bicycle frame securing set is disposed on a top surface of the in-vehicle part. The securing band set includes a band body and a buckle ring disposed on the sides, away from each other, of the in-vehicle part and the out-vehicle part, respectively.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
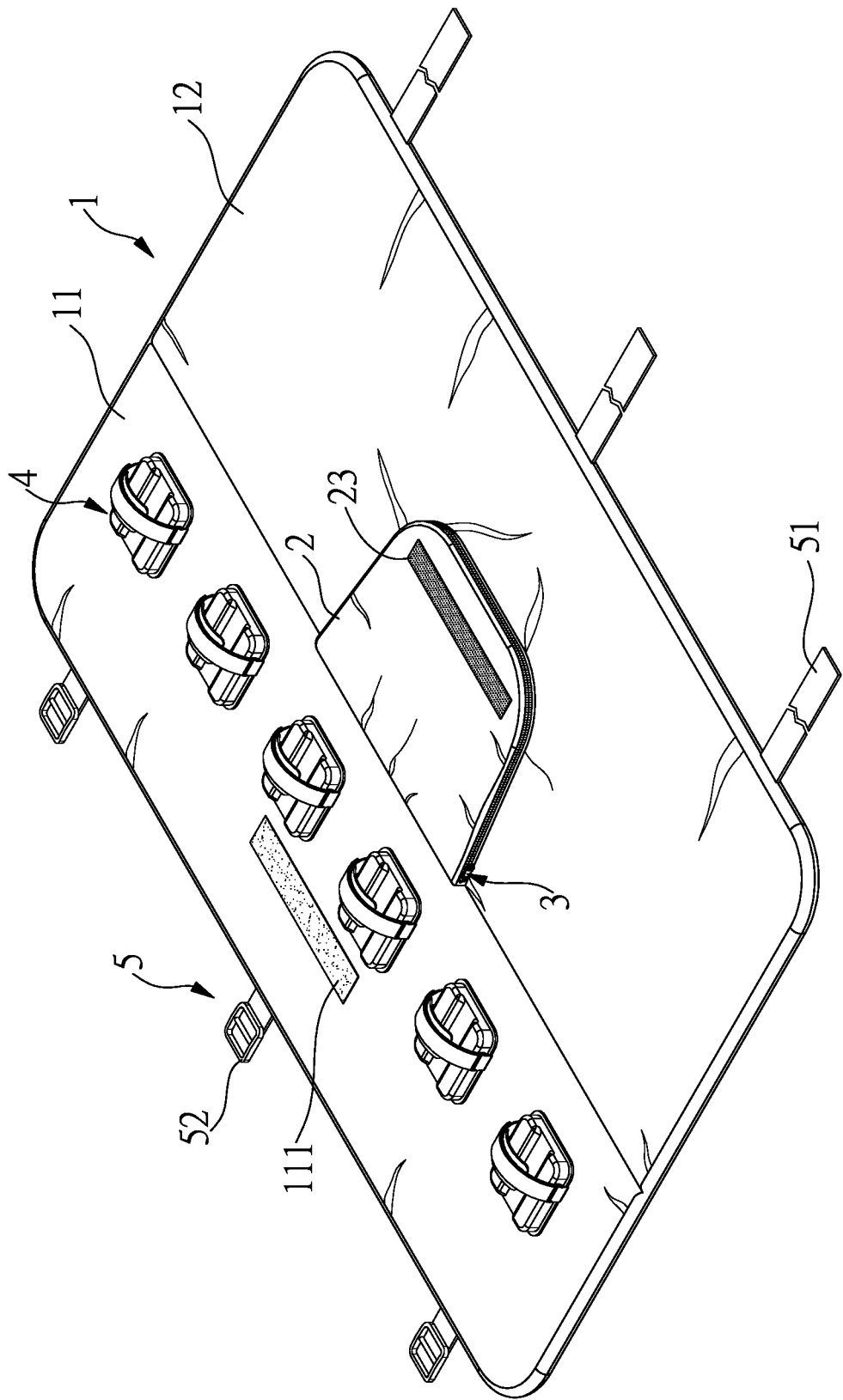
FIG. 1 is a perspective view of a vehicle-tail-mounted bicycle pad, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on may be used herein to describe various elements, these elements should not, be limited by these terms. These terms are used only for the purpose of distinguishing one component from another component. Thus, a first element discussed herein could be termed a second element without altering the description of the present disclosure.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The implementation of the present invention will be described in detail with reference to figures in the following paragraphs. As shown in FIGS. 1 to 7, a vehicle-tail-mounted bicycle pad includes a main pad body 1, a blocking plate 2, a bicycle frame securing set 4 and a securing band set 5. The main pad body 1 includes an in-vehicle part 11 and an out-vehicle part 12 connected to each other, and the out-vehicle part 12 includes an opening 121 formed thereon. A side of the blocking plate 2 is connected to the main pad body 1; another side, which is not directly connected to the main pad body 1, of the blocking plate 2 is movably connected to the main pad body 1 through the zipper set 3. The blocking plate 2 is configured to movably block the opening 121 and includes a first Velcro 23 disposed on a surface thereof away from the main pad body 1, the in-vehicle part 11 includes a second Velcro 111 disposed on a top surface thereof, and the first Velcro 23 and the second Velcro 111 can be movably attached with each other. The bicycle frame securing set 4 is disposed on a top surface of the in-vehicle part 11. The securing band set 5 includes a band body 51 and a buckle ring 52 disposed on the sides, away from each other, of the out-vehicle part 12 and the in-vehicle part 11.

The amount of the bicycle frame securing set 4 and the securing band set 5 can be more upon design.

Figure 2:
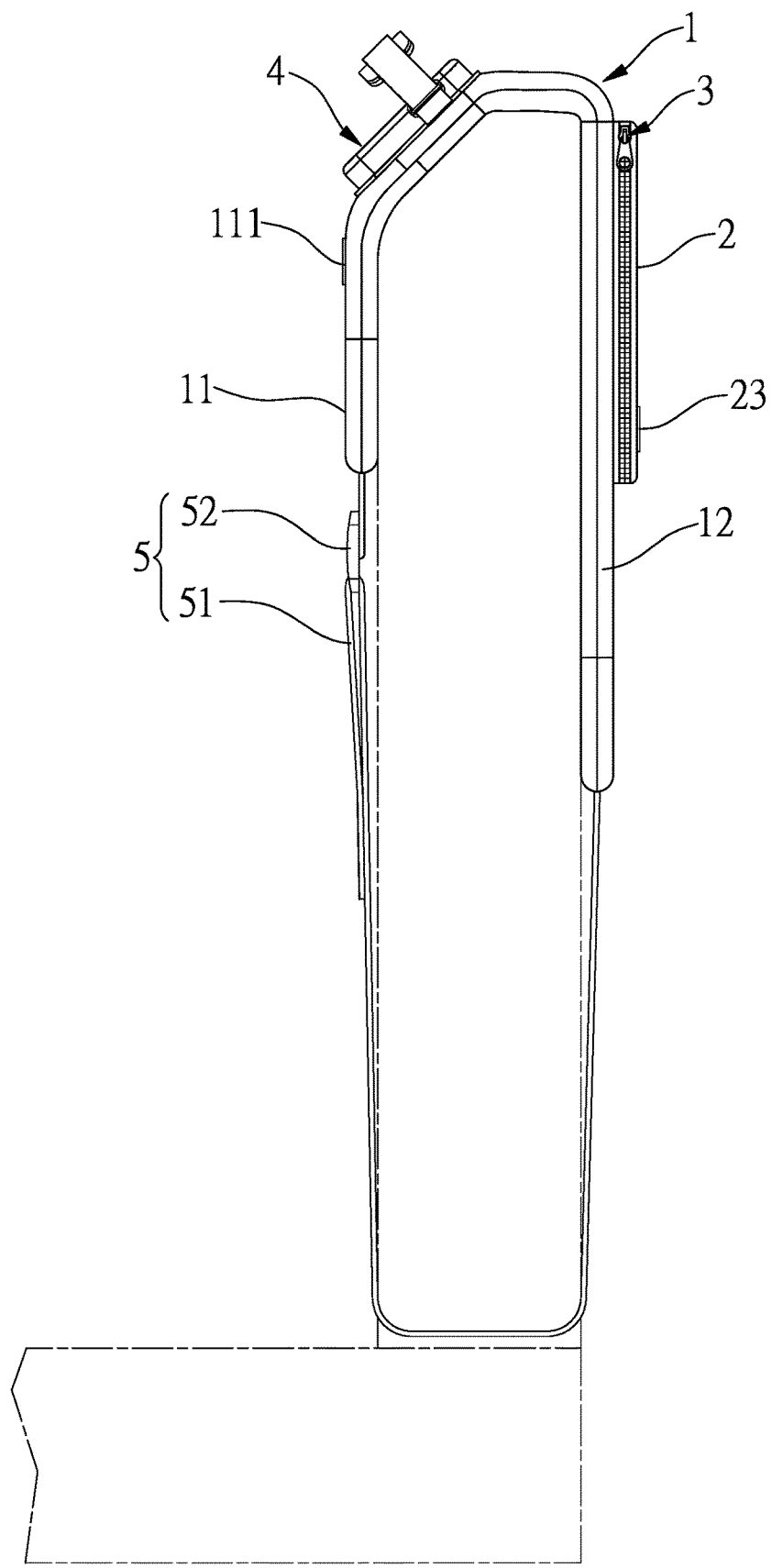
FIG. 2 is a schematic view of a usage status of a vehicle-tail-mounted bicycle pad, according to the present invention.
Figure 3:
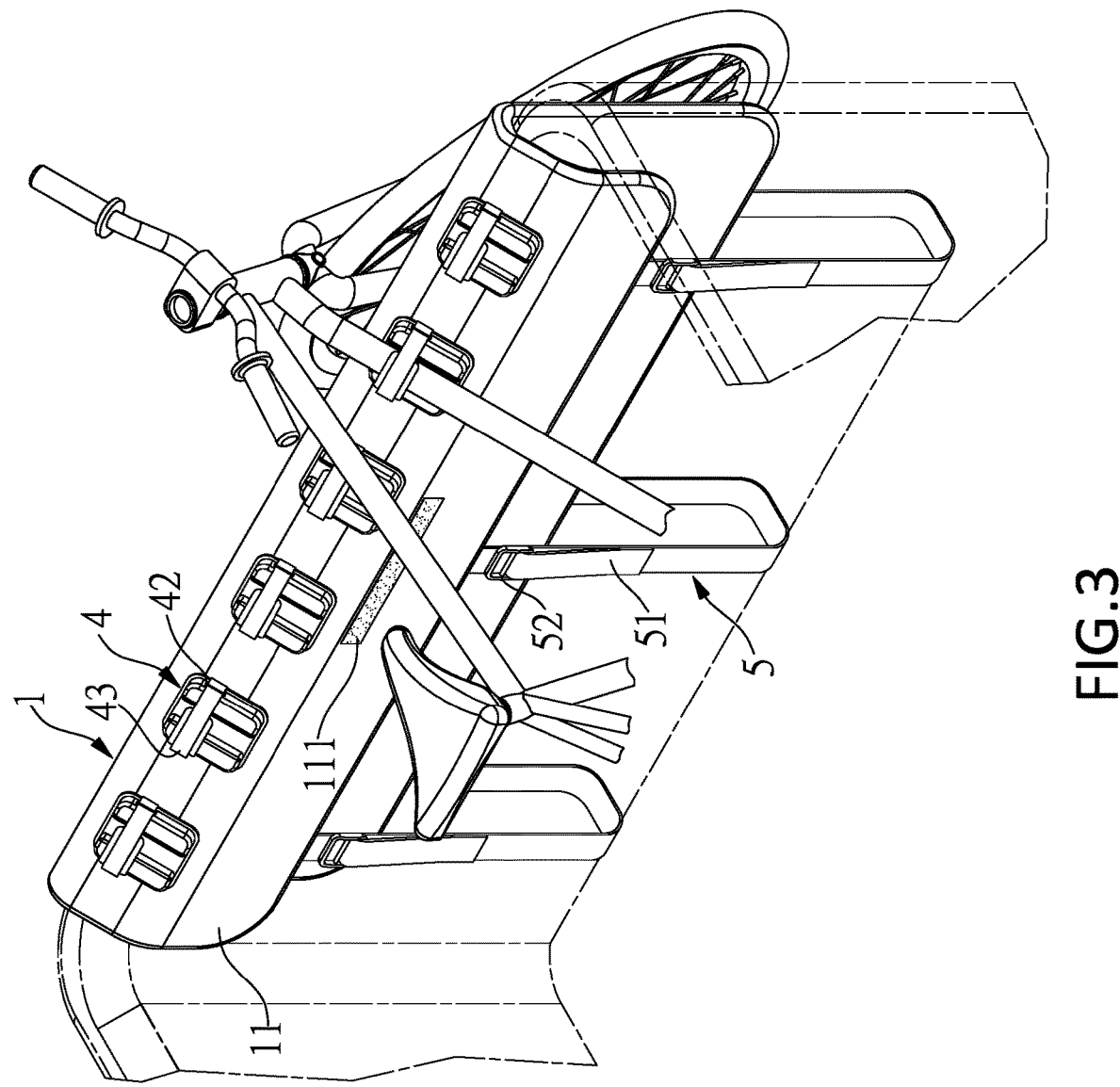
FIG. 3 is a schematic view of a vehicle-tail-mounted bicycle pad securing with a bicycle, according to the present invention.

The implementation of the present invention is further described in detail following the above description. As shown in FIG. 2, the main pad body 1 is straddled and mounted on the vehicle-tail baffle plate, the out-vehicle part 12 is located outside the vehicle body, the in-vehicle part 11 has a portion facing the vehicle compartment and other portion located on the vehicle-tail baffle plate. The band body 51 of the securing band set 5 can be inserted through a gap between the bottom of the vehicle-tail baffle plate and the vehicle body, and the band body 51 can be secured with the buckle ring 52, so as to complete mounting operation of the present invention. In order to secure the bicycle with the vehicle, a user just needs to make the bicycle straddle and mount on the main pad body 1 to make the bicycle frame align to the bicycle frame securing set 4, so that the user can operate the bicycle frame securing set 4 to secure the bicycle frame, as shown in FIG. 3.

Figure 4:
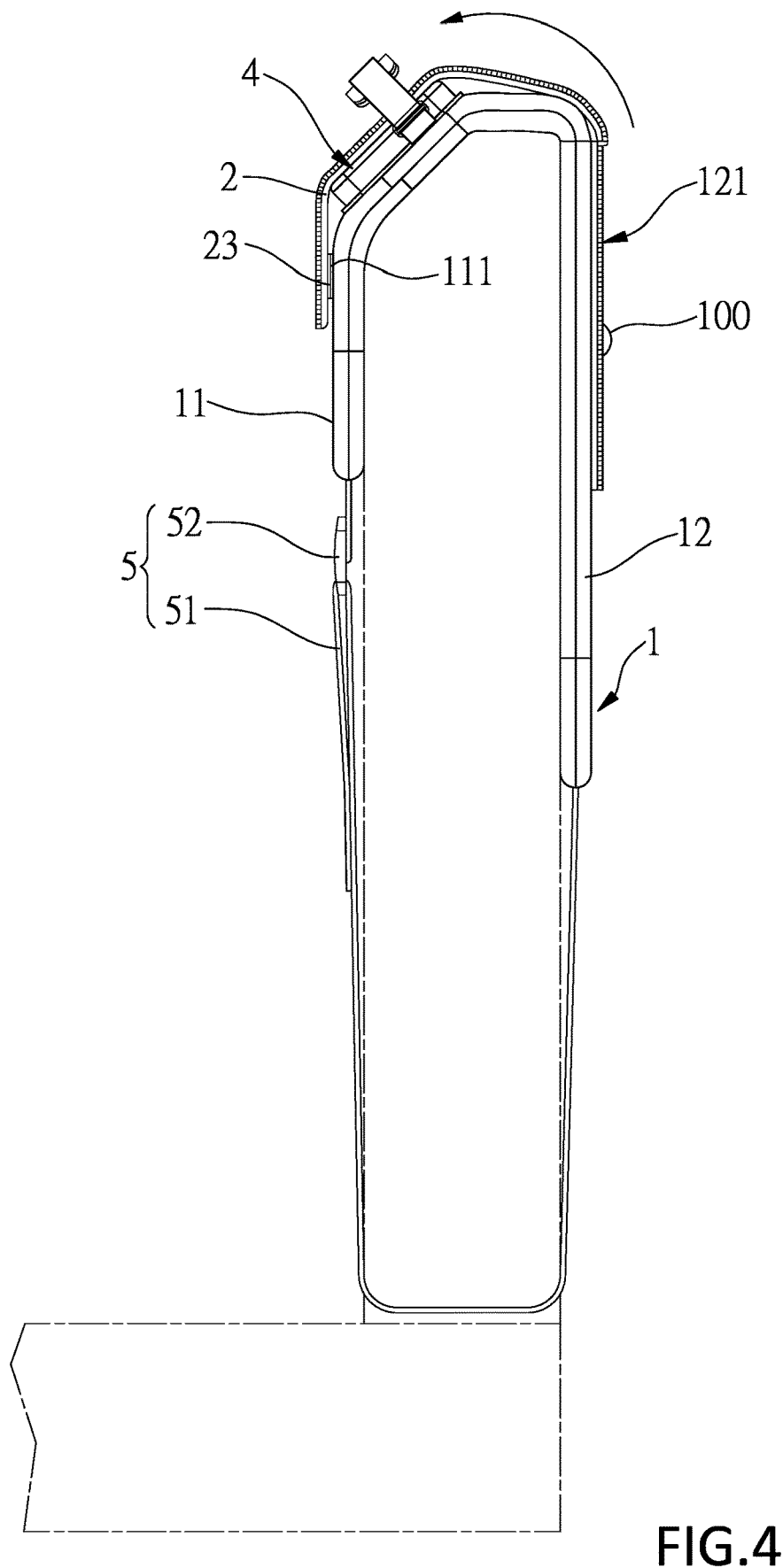
FIG. 4 is a schematic view showing that a blocking plate is lifted and a first Velcro and a second Velcro are attached with each other, according to the present invention.
Figure 5:
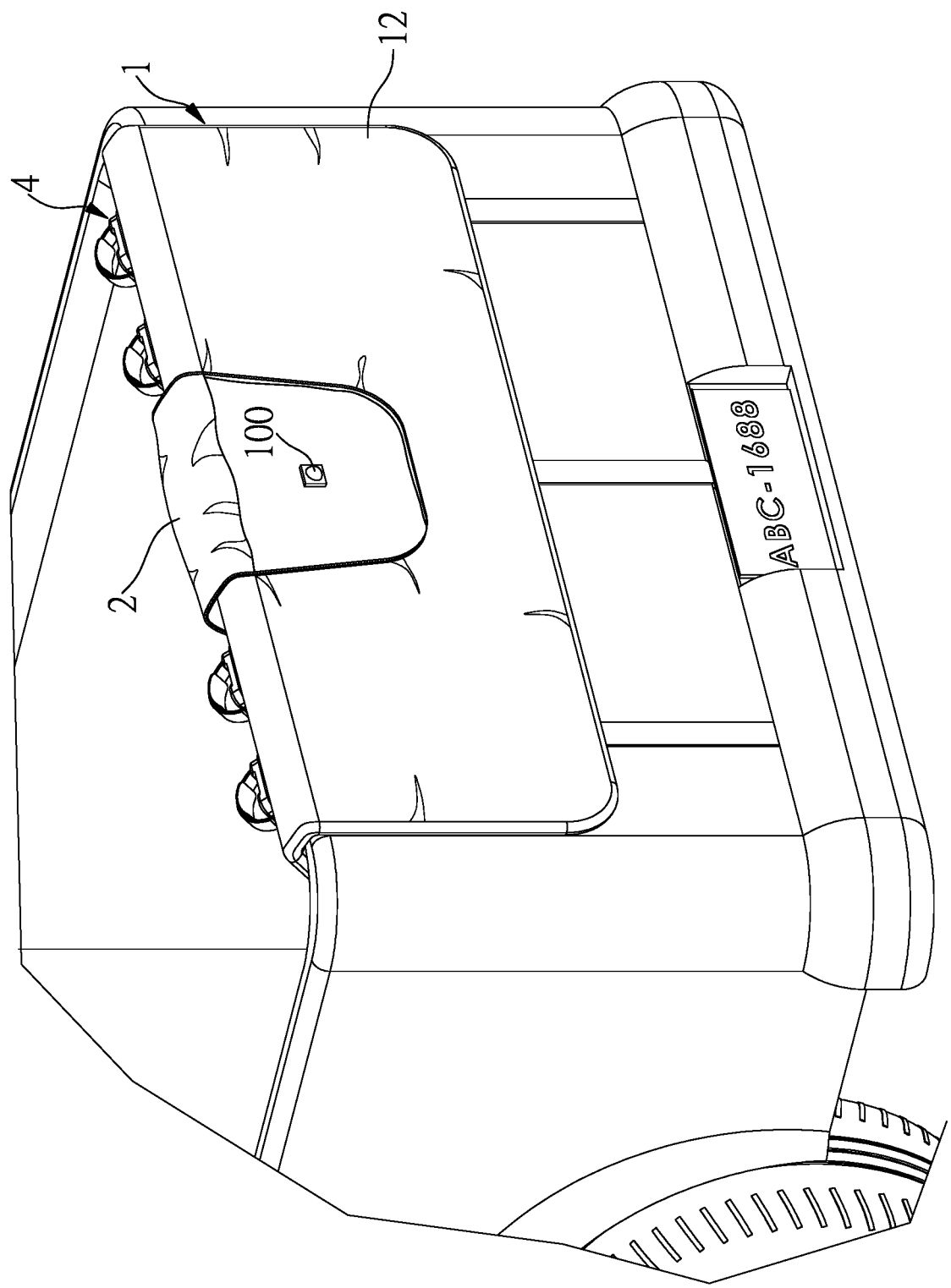
FIG. 5 is a perspective view of a lifted blocking plate of the present invention, when viewed from a rear view angle.

In an embodiment, in the condition that the vehicle tail is set with a camera lens 100, in order to prevent the blocking plate 2 from blocking the camera lens 100, the blocking plate 2 can be lifted up to expose the camera lens 100 through the opening 121, as shown in FIG. 4; the first Velcro 23 and the second Velcro 111 can be a hook-sided surface and a loop-sided surface, respectively, and after the blocking plate 2 is lifted up, the first Velcro 23 can be attached with the second Velcro 111 of the main pad body 1, so as to prevent the blocking plate 2 from easily dropping to block the camera lens 100 because of bump during the vehicle traveling. As a result, the present invention is able to indeed solve one of problems of the conventional products.

Figure 7:
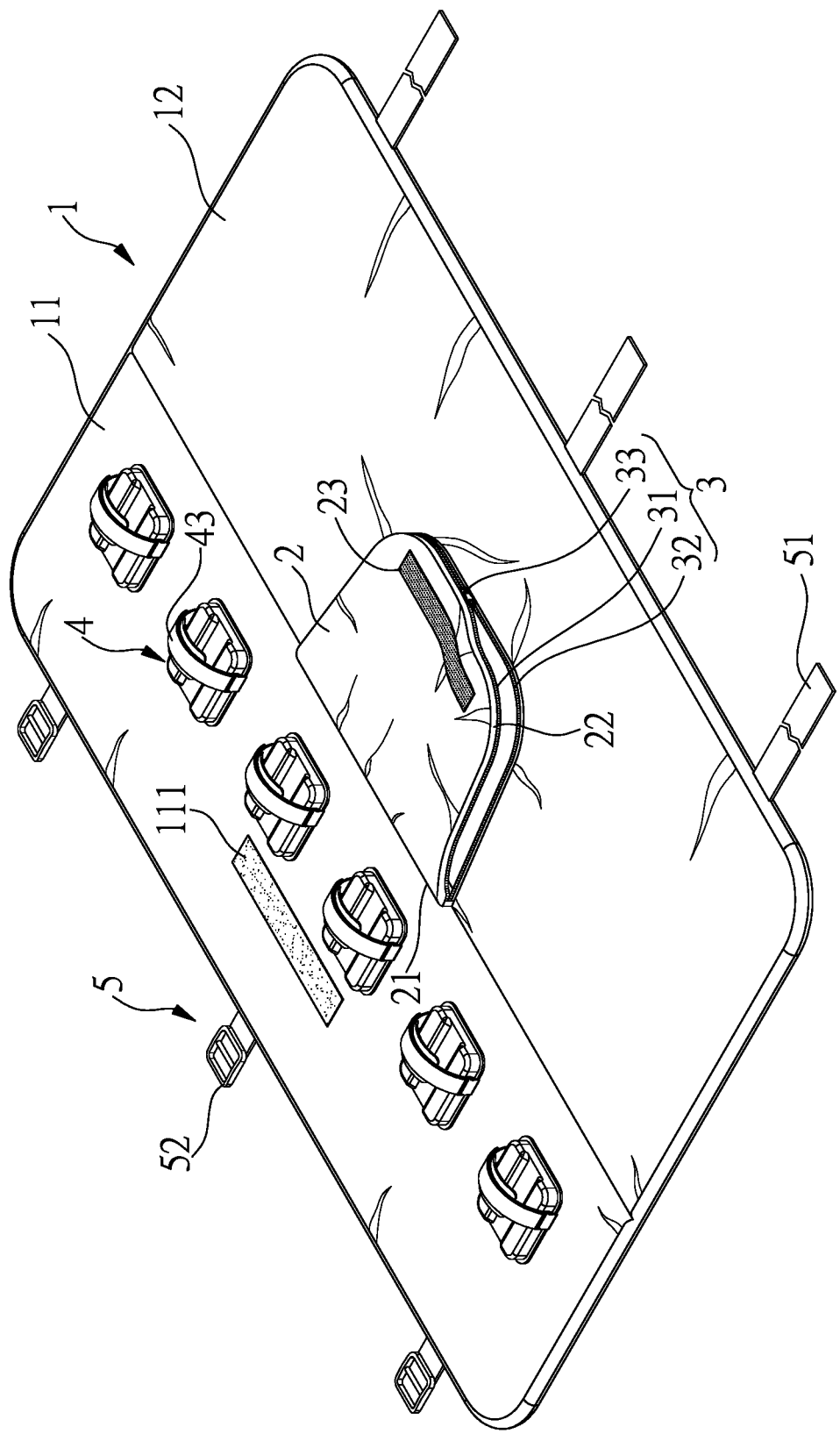
FIG. 7 is a schematic view showing that a zipper set of blocking plate is connected to a main pad body, according to the present invention.

In a condition that the vehicle tail is not set with the camera lens, as shown in FIGS. 1 and 7, the blocking plate 2 can be connected to the main pad body 1 through the zipper set 3, so as to prevent from forming a gap between blocking plate 2 and the opening 121 because of bump during vehicle traveling, and the gap may cause failure of blocking performance of the blocking plate 2. As a result, the present invention indeed solves another problem of the conventional product.

According to the above-mentioned contents, the present invention is able to solve the conventional problems effectively, and has novelty and non-obviousness.

Figure 8:
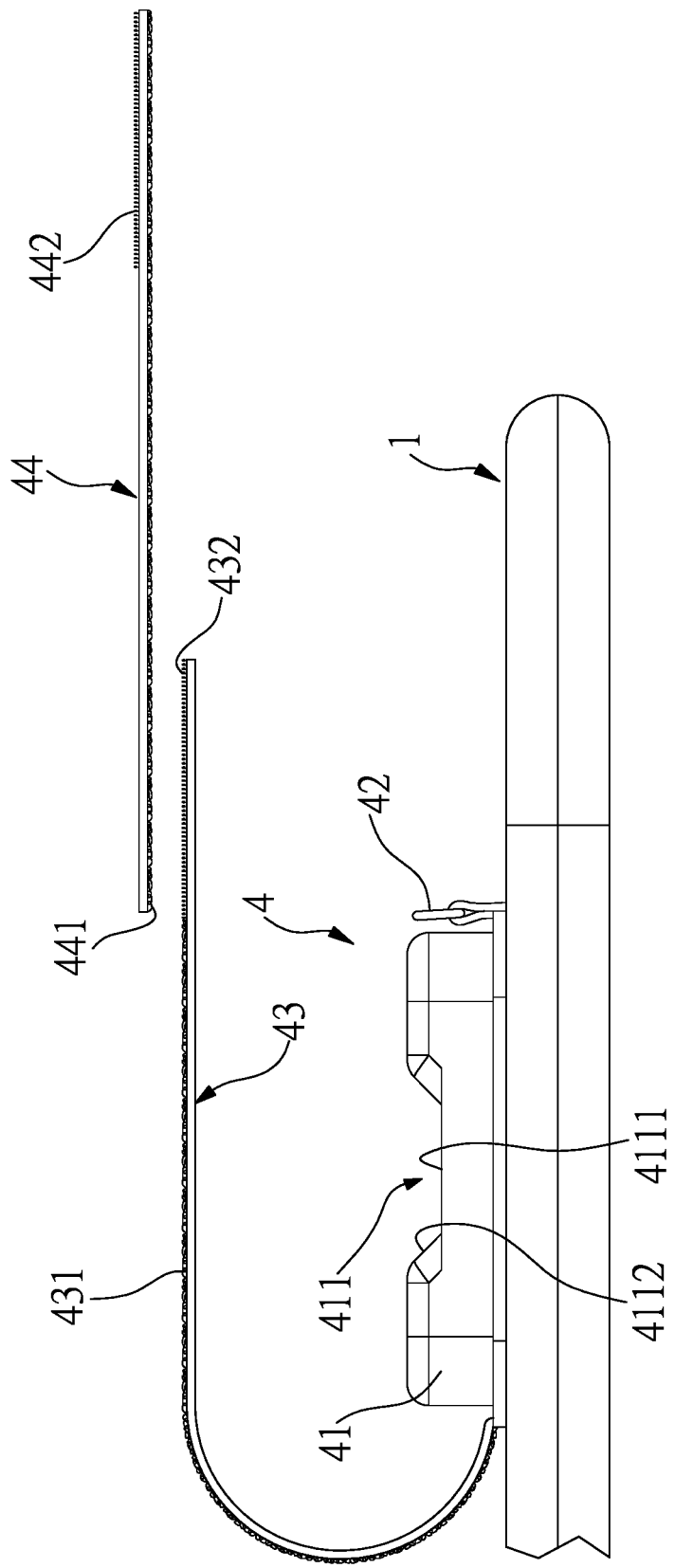
FIG. 8 is an exploded view of a part of a bicycle frame securing set, according to the present invention.
Figure 9:
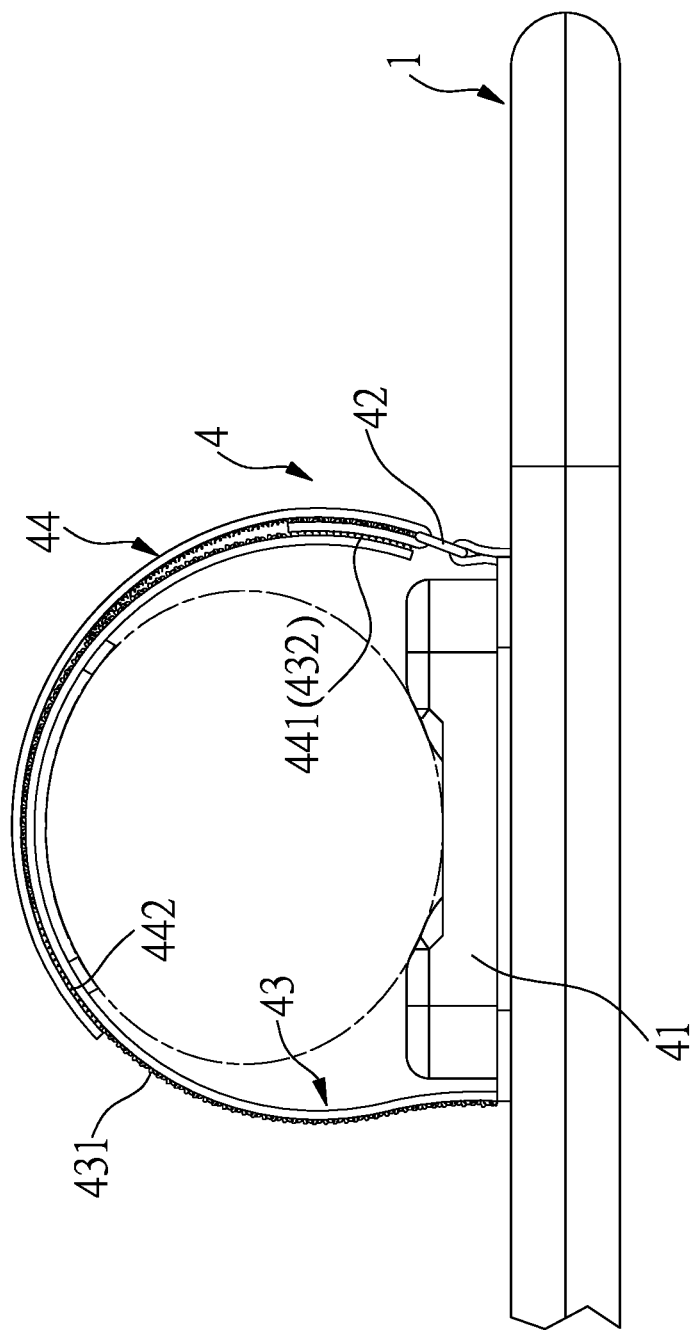
FIG. 9 is a schematic view of a bicycle frame securing set in use, according to the present invention.

Furthermore, in an embodiment, other type of the bicycle frame securing set 4 is provided. As shown in FIGS. 8 and 9, the bicycle frame securing set 4 can include a securing base 41, an annular body 42, a strap 43 and an extension band 44. The securing base 41 is disposed on a top of the in-vehicle part 11, the annular body 42 and the strap 43 are disposed on two sides of the securing base 41, respectively; the strap 43 has a first connection part 431 and a second connection part 432 disposed on the same surface thereof, the first connection part 431 and the second connection part 432 are movably connected to each other, and the second connection part 432 is disposed on an end of the strap 43 away from the securing base 41. The extension band 44 includes a third connection part 441 and a fourth connection pan 442 disposed on two opposite surfaces thereof, respectively; the third connection part 441 and the second connection part 432 are movably connected to each other, and the fourth connection part 442 and first connection part 431 are movably connected to each other. The available bicycles in market have many styles, and some styles of bicycles have bicycle frames with pipe diameters far larger than that of common bicycle, so the extension band 44 can be added to effectively secure the bicycle having the bicycle frame with larger pipe diameter.

In an embodiment, other type of the securing base 41 is provided, as shown in FIGS. 8 and 9, the securing base 41 has a fastening groove 411 formed on a side thereof away from the main pad body 1, the structure is helpful to secure the bicycle frame of the bicycle, so as to prevent the bicycle from easily swaying during traveling of the vehicle.

Furthermore, in an embodiment, other type of the securing base 41 is provided, as shown in FIGS. 8 and 9, the fastening groove 411 has a groove bottom 4111, and two groove walls 4112 connected to two sides of the groove bottom 4111, and the two groove walls 4112 are gradually inclined outwardly in a direction away from the groove bottom 4111. The groove walls 4112, which are outwardly extended and inclined, is helpful to easily place the bicycle frame of the bicycle into the fastening groove 411.

As shown in FIGS. 1 and 4, the side of the blocking plate 2 connected to the main pad body 1 is located at the junction of the in-vehicle part 11 and the out-vehicle part 12, so that the blocking plate 2 connected to the junction can be lifted up more easily.

Figure 6:
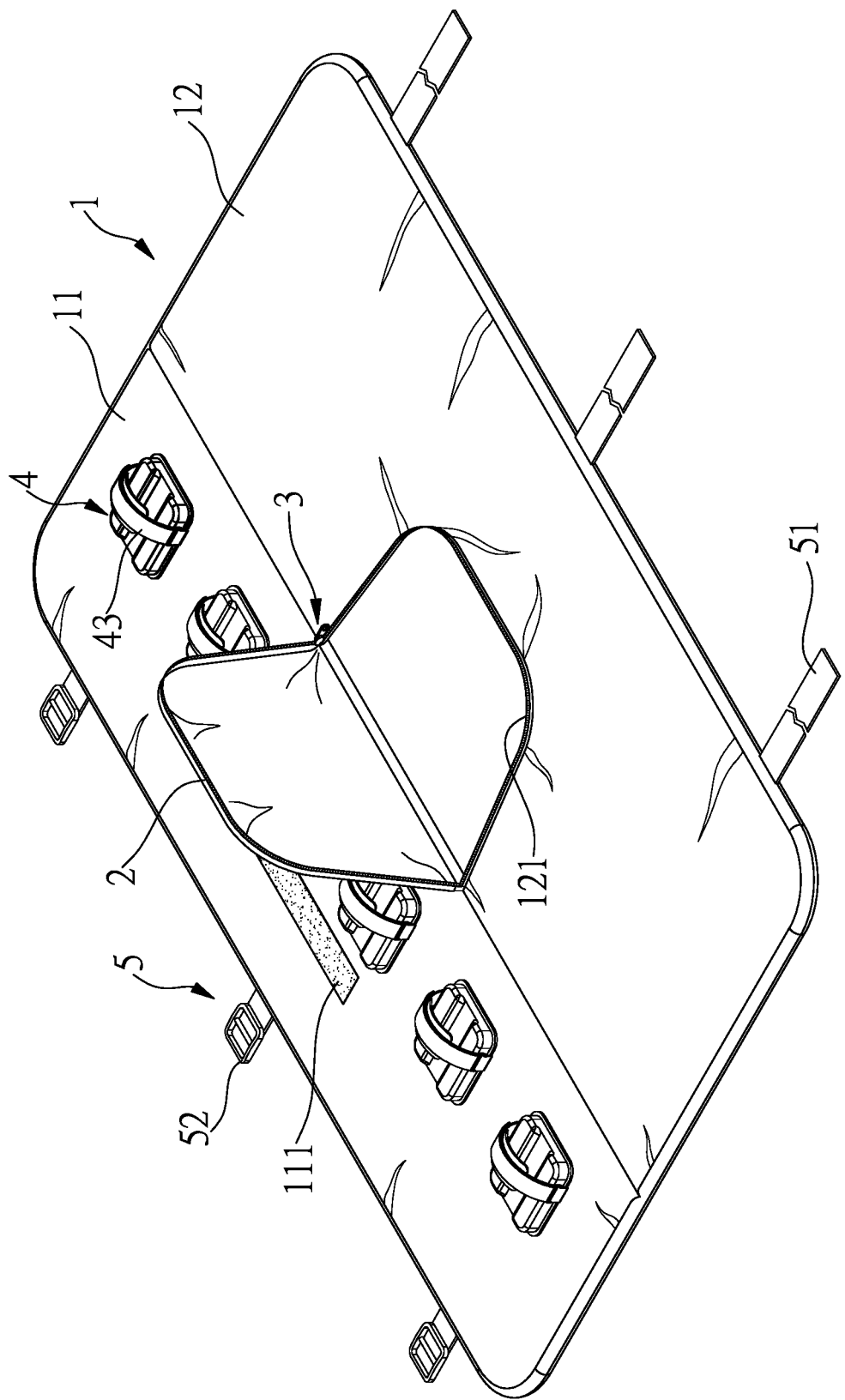
FIG. 6 is a perspective view of a blocking plate being slightly lifted, according to the present invention.

Furthermore, in an embodiment, other type of the zipper set 3 is provided, as shown in FIGS. 6 and 7, the blocking plate 2 includes a flat side 21 and a curved side 22, the flat side 21 is connected to the main pad body 1, the zipper set 3 includes a first tooth row 31, a second tooth row 32 and a pulling head 33, the first tooth row 31 is connected to the curved side 22, the second tooth row 32 is connected to an edge of the opening 121, and the pulling head 33 is disposed between the first tooth row 31 and second tooth row 32, so that the pulling head 33 can be operated to connect or separate the first tooth row 31 and the second tooth row 32. The above-mentioned configuration can make the blocking plate 2 fully block the opening 121.

Furthermore, in an embodiment, a surface of the out-vehicle part 12 closer to the blocking plate 2 has an area at least three times an area of the opening 121, and this configuration can make the size of the opening 121 sufficiently meet a setting position of different camera lens 100, and the size of the opening 121 is not excessively large.

Furthermore, in an embodiment, the band body 51 can include Velcro, so that the band body 51 can be quickly connected to or separated from the buckle ring 52.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A vehicle-tail-mounted bicycle pad, comprising:
   a main pad body comprising an in-vehicle part and an out-vehicle part connected to each other, wherein the out-vehicle part comprises an opening formed thereon;
   a blocking plate having a side connected to the main pad body, and another side, which is not directly connected to the main pad body, movably connected to the main pad body through a zipper set, wherein the blocking plate is configured to movably block the opening, the blocking plate comprises a first hook and loop fastener disposed on a surface thereof away from the main pad body, the in-vehicle part comprises a second hook and loop fastener disposed on a top surface thereof, and the first hook and loop fastener and the second hook and loop fastener are movably attached with each other;
   a bicycle frame securing set: disposed on a top surface of the in-vehicle part; and
   a securing band set comprising a band body and a buckle ring disposed on the sides, away from each other, of the in-vehicle part and the out-vehicle part, respectively.

2. The vehicle-tail-mounted bicycle pad according to claim 1, wherein the bicycle frame securing set comprises a securing base, an annular body, a strap and an extension band, the securing, base is disposed on a top of the in-vehicle part, the annular body and the strap are disposed on two sides of the securing base, respectively, and the strap has a first connection part and a second connection part disposed on the same surface thereof, the first connection part and the second connection part are movably connected to each other, the second connection part is disposed on an end of the strap away from the securing base, and the extension band comprises a third connection part and a fourth connection part disposed on two opposite surfaces thereof, respectively, wherein the third connection part and the second connection part are movably connected to each other, and the fourth connection part and first connection part are movably connected to each other.

3. The vehicle-tail-mounted bicycle pad according to claim 2, wherein the securing base has a fastening groove formed on a side thereof away from the main pad body.

4. The vehicle-tail-mounted bicycle pad according to claim 3, wherein the fastening groove has a groove bottom, and two groove walls connected to two sides of the groove bottom, and the two groove walls are gradually inclined outwardly in a direction away from the groove bottom.

5. The vehicle-tail-mounted bicycle pad according to claim 1, wherein the side of the blocking plate connected to the main pad body is located at a junction of the in-vehicle part and the out-vehicle part.

6. The vehicle-tail-mounted bicycle pad according to claim 1, wherein the blocking plate comprises a flat side and a curved side, the flat side is connected to the main pad body, the zipper set comprises a first tooth row, a second tooth row and a pulling head, the first tooth row is connected to the curved side, the second tooth row is connected to an edge of the opening, and the pulling head is disposed between the first tooth row and the second tooth row and configured to connect or separate the first tooth row and the second tooth row.

7. The vehicle-tail-mounted bicycle pad according to claim 1, wherein a surface of the out-vehicle part closer to the blocking plate has an area at least three times an area of the opening.

8. The vehicle-tail-mounted bicycle pad according to claim 1, wherein the band body comprises a third hook and loop fastener.

\* \* \* \* \*